US012797985B2

(12) United States Patent
Xia

(10) Patent No.: US 12,797,985 B2
(45) Date of Patent: Nov. 17, 2026

(54) SOLDER RIBBON PROCESSING MECHANISM

(71) Applicant: Wuxi Autowell Technology Co., Ltd., Wuxi (CN)

(72) Inventor: Jun Xia, Wuxi (CN)

(73) Assignee: Wuxi Autowell Technology Co., Ltd., Wuxi (CN)

(*) Notice: Subject to any disclaimer, the term of this patent is extended or adjusted under 35 U.S.C. 154(b) by 204 days.

(21) Appl. No.: 18/863,350

(22) PCT Filed: May 10, 2023

(86) PCT No.: PCT/CN2023/093174
§ 371 (c)(1),
(2) Date: Nov. 6, 2024

(87) PCT Pub. No.: WO2023/217167
PCT Pub. Date: Nov. 16, 2023

(65) Prior Publication Data
US 2025/0296170 A1 Sep. 25, 2025

(30) Foreign Application Priority Data
May 11, 2022 (CN) ......................... 202210510599.8

(51) Int. Cl.
*B23K 3/08* (2006.01)
*B23D 33/02* (2006.01)
(Continued)

(52) U.S. Cl.
CPC ................ *B23K 3/08* (2013.01); *B23D 33/02* (2013.01); *B23K 35/40* (2013.01); *B23K 35/0227* (2013.01)

(58) Field of Classification Search
CPC .......... B23K 3/08; B23K 3/087; B23D 33/02; B23D 33/025; B23D 33/04-06; H05K 2203/163; Y10T 83/202; Y10T 83/0448
(Continued)

(56) References Cited

U.S. PATENT DOCUMENTS 4,110,592 A * 8/1978 Ege ...................... B23K 1/0004
219/85.2
5,062,566 A * 11/1991 Ege ...................... B23K 1/0008
228/5.7
(Continued)

FOREIGN PATENT DOCUMENTS

CN 209843729 12/2019
CN 113314636 8/2021
(Continued)

*Primary Examiner* — Ghassem Alie
*Assistant Examiner* — Richard D Crosby, Jr.

(57) ABSTRACT

The present disclosure provides a solder ribbon processing mechanism, comprising a plurality of first solder ribbon clamping assemblies, a plurality of second solder ribbon clamping assemblies, a plurality of first solder ribbon cutters, and a plurality of second solder ribbon cutters. The plurality of first solder ribbon clamping assemblies cooperate to clamp all odd numbered solder ribbons of a plurality of solder ribbons, and the first solder ribbon cutters are configured for cutting off all the odd numbered solder ribbons at corresponding positions, so as to obtain a plurality of first solder ribbon groups. The plurality of second solder ribbon clamping assemblies cooperate to clamp all second numbered solder ribbons of a plurality of solder ribbons, and the second solder ribbon cutters are configured for cutting off all the even numbered solder ribbons at corresponding positions, so as to obtain a plurality of second solder ribbon groups.

15 Claims, 4 Drawing Sheets

(51) Int. Cl.
*B23K 35/02* (2006.01)
*B23K 35/40* (2006.01)

(58) Field of Classification Search
USPC ........................................................ 83/78
See application file for complete search history.

(56) References Cited

U.S. PATENT DOCUMENTS

| | | | | |
|---|---|---|---|---|
| 5,871,137 | A * | 2/1999 | Ege | B23K 37/0408 228/171 |
| 10,286,967 | B2 * | 5/2019 | Kim | B23K 11/11 |
| 12,463,233 | B2 * | 11/2025 | Lee | B23K 26/38 |
| 2011/0131799 | A1 * | 6/2011 | Ito | H01M 10/0409 72/203 |
| 2013/0252072 | A1 * | 9/2013 | Min | H01M 4/04 429/163 |
| 2017/0029052 | A1 * | 2/2017 | Jin | B23K 26/032 |
| 2018/0304385 | A1 * | 10/2018 | Kitai | B23D 47/045 |

FOREIGN PATENT DOCUMENTS

| | | |
|---|---|---|
| CN | 113314637 | 8/2021 |
| CN | 113319503 | 8/2021 |
| CN | 113629168 | 11/2021 |
| CN | 215356860 | 12/2021 |
| CN | 113937178 | 1/2022 |
| CN | 217701580 | 11/2022 |

* cited by examiner

SOLDER RIBBON PROCESSING MECHANISM

TECHNICAL FIELD

The present disclosure relates to the field of production of cells, and in particular to a solder ribbon processing mechanism.

BACKGROUND ART

Interdigitated back contact (IBC) cells are provided with no main grid lines on front surfaces thereof, and with positive electrode rows and negative electrode rows both disposed on back surfaces thereof, so that the shading of the cells is reduced, and the optical conversion efficiency of the cells is improved.

As shown in FIG. 1, a back surface of an interdigitated back contact cell 200 is provided with first electrodes (such as positive electrodes) and second electrodes (such as negative electrodes) that have opposite polarities, the first electrodes are arranged in columns and form at least two columns of first electrode rows 201, the second electrodes are arranged in columns and form at least two columns of second electrode rows 202, and the first electrode rows 201 and the second electrode rows 202 are arranged in a staggered manner.

As shown in FIG. 2, the interdigitated back contact cells are welded in a string by sequentially laying N (e.g., 4 in the figure) cells 200 with back surfaces facing upwards in such a way that the electrode rows of adjacent cells that are on the same line have opposite polarities. The N cells 200 are welded in a string by using N+1 (e.g. five as in the figure) solder ribbon groups, wherein first solder ribbon groups (a first solder ribbon group, a third solder ribbon group and a fifth solder ribbon group in figure) and second solder ribbon groups (a second solder ribbon group and a fourth solder ribbon group in figure) are laid in a staggered manner.

According to a conventional interdigitated back contact cell string welding process, in order to staggered laying of the first solder ribbon groups and the second solder ribbon groups, and a solder ribbon drawing mechanism needs to alternately draw and obtain the first solder ribbon groups and the second solder ribbon groups from a solder ribbon supply station and then lay the first solder ribbon groups and the second solder ribbon groups onto cells in a staggered manner.

The conventional interdigitated back contact cell string welding process has a low solder ribbon processing efficiency, and ultimately affects the production efficiency of a cell string.

SUMMARY

In order to solve the above technical problem, the present disclosure provides a solder ribbon processing mechanism which employs the following technical solution.

A solder ribbon processing mechanism for processing a plurality of solder ribbons extending in a first horizontal direction to obtain a plurality of first solder ribbon groups and a plurality of second solder ribbon groups includes a plurality of first solder ribbon clamping assemblies, a plurality of second solder ribbon clamping assemblies, a plurality of first solder ribbon cutters and a plurality of second solder ribbon cutters which are arranged in the first horizontal direction, wherein the plurality of first solder ribbon clamping assemblies cooperate to clamp all odd numbered solder ribbons of the plurality of solder ribbons, one of the first solder ribbon cutters is arranged between adjacent first solder ribbon clamping assemblies, and the first solder ribbon cutters are configured for cutting off all the odd numbered solder ribbons at corresponding positions, so as to obtain the plurality of first solder ribbon groups;

the plurality of second solder ribbon clamping assemblies cooperate to clamp all even numbered solder ribbons of the plurality of solder ribbons, one of the second solder ribbon cutters is arranged between adjacent second solder ribbon clamping assemblies, and the second solder ribbon cutters are configured for cutting off all the even numbered solder ribbons at corresponding positions, so as to obtain the plurality of second solder ribbon groups;

before all the odd numbered solder ribbons are cut off, the plurality of first solder ribbon clamping assemblies and the plurality of second solder ribbon clamping assemblies are relatively translated in the first horizontal direction, such that all the odd numbered solder ribbons are staggered with all the even numbered solder ribbons by a predetermined distance in the first horizontal direction;

after all the odd numbered solder ribbons are cut off, the first solder ribbon clamping assemblies each clamp a corresponding first solder ribbon group, and the first solder ribbon clamping assemblies are further configured to be separated from each other in the first horizontal direction to separate the first solder ribbon groups from each other; and after all the even numbered solder ribbons are cut off, the second solder ribbon clamping assemblies each clamp a corresponding second solder ribbon group, and the second solder ribbon clamping assemblies are further configured to be separated from each other in the first horizontal direction to separate the second solder ribbon groups from each other.

The present disclosure automatically cuts the solder ribbons into the first solder ribbon groups and the second solder ribbon groups by means of the cooperation of the first solder ribbon clamping assemblies, the second solder ribbon clamping assemblies, the first solder ribbon cutters and the second solder ribbon cutters, achieves the misalignment between the first solder ribbon groups and the second solder ribbon groups, and adjusts a distance between the first solder ribbon groups and a distance between the second solder ribbon groups.

In this way, a downstream solder ribbon laying mechanism can lay all of the first solder ribbon groups and the second solder ribbon groups on cells at a time, so that the production efficiency of an IBC cell string is greatly improved.

In some embodiments, each of the first solder ribbon clamping assemblies includes a first solder ribbon head clamp group and a first solder ribbon tail clamp group, the first solder ribbon head clamp group and the first solder ribbon tail clamp group cooperate to clamp all the odd numbered solder ribbons at corresponding positions, and after all the odd numbered solder ribbons are cut off, the first solder ribbon head clamp group clamp the heads of corresponding first solder ribbon groups, and the first solder ribbon tail clamp group clamp the tails of the corresponding first solder ribbon groups; and each of the second solder ribbon clamping assemblies includes a second solder ribbon head clamp group and a second solder ribbon tail clamp group, the second solder ribbon head clamp group and the second solder ribbon tail clamp group cooperate to clamp all the even numbered solder ribbons at corresponding positions, and after all the even numbered solder ribbons are cut off, the second solder ribbon head clamp group clamps the heads of corresponding second solder ribbon groups, and the second solder ribbon tail clamp group clamps the tails of the corresponding second solder ribbon groups.

The first solder ribbon clamping assemblies and the second solder ribbon clamping assemblies are configured such that the heads and the tails of the first solder ribbon groups are respectively clamped by the corresponding first solder ribbon tail clamp group and the first solder ribbon tail clamp group after the segmented cutting of the solder ribbons is completed, thus preventing the heads and the tails of the first solder ribbon groups from falling. Similarly, the heads and the tails of the second solder ribbon groups are respectively clamped by the corresponding second solder ribbon tail clamp group and the second solder ribbon tail clamp group.

In some embodiments, the first solder ribbon head clamp group and the first solder ribbon tail clamp group each include a plurality of first clamps arranged in a second horizontal direction perpendicular to the first horizontal direction, and after all the odd numbered solder ribbons are cut off, the first clamps each clamp the head or the tail of a corresponding first solder ribbon; and the second solder ribbon head clamp group and the second solder ribbon tail clamp group each include a plurality of second clamps arranged in the second horizontal direction, and after all the even numbered solder ribbons are cut off, the second clamps each clamp the head or the tail of a corresponding second solder ribbon.

The first solder ribbon head clamp group and the first solder ribbon tail clamp group are configured such that all the first solder ribbons of the first solder ribbon groups are firmly clamped. Similarly, the second solder ribbon head clamp group and the second solder ribbon tail clamp group are configured such that all the second solder ribbons of the second solder ribbon groups are firmly clamped.

In some embodiments, the first solder ribbon cutter and the second solder ribbon cutter each include a mounting bracket, a fixed cutter, a movable cutter, and a movable cutter drive mechanism, wherein the fixed cutter is fixedly arranged on the mounting bracket and extends in the second horizontal direction, and a fixed cutting blade is formed at an upper side rim of the fixed cutter; the movable cutter is slidably arranged on the mounting bracket and fits with the fixed cutter, the movable cutter is provided with a plurality of cutter hooks arranged side by side in the second horizontal direction, the cutter hooks protrude upwardly from the upper side rim of the movable cutter, and a movable cutting blade is formed at a lower side rim of each of the cutter hooks; the movable cutter drive mechanism is configured for driving the movable cutter to slide relative to the fixed cutter, so as to enable the movable cutter to switch between a higher position and a lower position; when the movable cutter slides to the higher position, a gap is formed between the movable cutting blade of each of the cutter hooks and the fixed cutting blade of the fixed cutter for a solder ribbon to pass through; and when the movable cutter slides to the lower position, the movable cutting blades of the cutter hooks and the fixed cutting blade of the fixed cutter cooperate to cut off the solder ribbons passing therebetween.

The first solder ribbon cutters and the second solder ribbon cutters are configured such that the first solder ribbon cutters can avoid all the even numbered solder ribbons which do not need to be cut when cutting all the odd numbered solder ribbons. Similarly, the second solder ribbon cutters can avoid all the odd numbered solder ribbons which do not need to be cut when cutting off all the even numbered solder ribbons. In addition, the cutter hooks can cut circular solder ribbons and can also cut flat solder ribbons, thus increasing the compatibility of the first solder ribbon cutters and the second solder ribbon cutters.

In some embodiments, the first solder ribbon cutters are connected to the former one of adjacent first solder ribbon clamping assemblies; and the second solder ribbon cutters are connected to the former one of adjacent second solder ribbon clamping assemblies.

With the configuration of the mounting of the first solder ribbon cutters and the second solder ribbon cutters, the first solder ribbon cutters and the second solder ribbon cutters can be moved synchronously with the first solder ribbon clamping assemblies and the second solder ribbon clamping assemblies. In this way, after the first solder ribbon clamping assemblies and the second solder ribbon clamping assemblies complete the misalignment between all the odd numbered solder ribbons and all the even numbered solder ribbons, the respective first solder ribbon cutters and the respective second solder ribbon cutters can cut off all the odd numbered solder ribbons and all the even numbered solder ribbons at corresponding positions, so as to obtain the first solder ribbon groups and the second solder ribbon groups.

In some embodiments, the solder ribbon processing mechanism further includes a base, and misalignment slide rails, first solder ribbon group separation slide rails and second solder ribbon group separation slide rails which extend in the first horizontal direction, wherein the misalignment slide rails are arranged on the base, the first solder ribbon group separation slide rails are slidably connected to the misalignment slide rails, and the plurality of first solder ribbon clamping assemblies are connected to the first solder ribbon group separation slide rails; the second solder ribbon group separation slide rails are arranged on the base, and the plurality of second solder ribbon clamping assemblies are connected to the second solder ribbon group separation slide rails; before all the odd numbered solder ribbons are cut off, the first solder ribbon group separation slide rails slide along the misalignment slide rails, such that all the odd numbered solder ribbons are staggered with all the even numbered solder ribbons by the predetermined distance in the first horizontal direction; after all the odd numbered solder ribbons are cut off, the plurality of first solder ribbon clamping assemblies slide apart along the first solder ribbon group separation slide rails to separate the first solder ribbon groups from each other; and after all the even numbered solder ribbons are cut off, the plurality of second solder ribbon clamping assemblies slide apart along the second solder ribbon group separation slide rails to separate the second solder ribbon groups from each other.

The misalignment slide rails, the first solder ribbon group separation slide rails and the second solder ribbon group separation slide rails are arranged on the base, and all the first solder ribbon clamping assemblies and all the second solder ribbon clamping assemblies are respectively arranged on the first solder ribbon group separation slide rails and the second solder ribbon group separation slide rails, such that the first solder ribbon clamping assemblies are misaligned with the second solder ribbon clamping assemblies, and the first solder ribbon clamping assemblies are separated from each other and the second solder ribbon clamping assemblies are separated from each other.

In some embodiments, the solder ribbon processing mechanism further comprises a misalignment drive assembly, a first separation drive assembly, and a second separation drive assembly which are arranged on the base, wherein the misalignment drive assembly is configured for driving the first solder ribbon group separation slide rails to slide along the misalignment slide rails; the first separation drive assembly is configured for driving the plurality of first solder ribbon clamping assemblies to slide apart along the first solder ribbon group separation slide rails; and the second separation drive assembly is configured for driving the plurality of second solder ribbon clamping assemblies to slide apart along the second solder ribbon group separation slide rails.

It can be seen that automatic misalignment between the first solder ribbon clamping assemblies and the second solder ribbon clamping assemblies can be achieved by providing the misalignment drive assembly. Automatic separation between the first solder ribbon clamping assemblies and between the second solder ribbon clamping assemblies is achieved by providing the first separation drive assembly and the second separation drive assembly.

In some embodiments, a rearmost first solder ribbon clamping assembly of the plurality of first solder ribbon clamping assemblies is fixed to the first solder ribbon group separation slide rails, and the remaining first solder ribbon clamping assemblies are slidably connected to the first solder ribbon group separation slide rails; adjacent first solder ribbon clamping assemblies are connected by means of a first connecting rod, wherein the first connecting rod is movably connected to a corresponding first solder ribbon clamping assembly at at least one end and is slidable relative to the first solder ribbon clamping assembly in the first horizontal direction; a driving end of the first separation drive assembly is connected to a frontmost first solder ribbon clamping assembly, and the first separation drive assembly drives the frontmost first solder ribbon clamping assembly to slide, so as to drive the plurality of first solder ribbon clamping assemblies to slide apart;

a rearmost second solder ribbon clamping assembly of the plurality of second solder ribbon clamping assemblies is fixed to the second solder ribbon group separation slide rails, and the remaining second solder ribbon clamping assemblies are slidably connected to the second solder ribbon group separation slide rails; adjacent second solder ribbon clamping assemblies are connected by means of a second connecting rod, wherein the second connecting rod is movably connected to a corresponding second solder ribbon clamping assembly at at least one end and is slidable relative to the second solder ribbon clamping assembly in the first horizontal direction; and a driving end of the second separation drive assembly is connected to a frontmost second solder ribbon clamping assembly, and the second separation drive assembly drives the frontmost second solder ribbon clamping assembly to slide, so as to drive the plurality of second solder ribbon clamping assemblies to slide apart.

With the above configuration of the mounting of the first solder ribbon clamping assemblies, the first solder ribbon clamping assemblies can be driven to slide apart only by driving the frontmost first solder ribbon clamping assembly to slide. Similarly, with the configuration of the mounting of the second solder ribbon clamping assemblies, the second solder ribbon clamping assemblies can be driven to slide apart only by driving the frontmost second solder ribbon clamping assembly to slide.

In some embodiments, a first connecting slide hole extending in the first horizontal direction is provided in at least one end of the first connecting rod, and a corresponding first solder ribbon clamping assembly is provided with a first connecting slide block, the first connecting slide block penetrating into the first connecting slide hole and being slidable in the first connecting slide hole; and a second connecting slide hole extending in the first horizontal direction is provided in at least one end of the second connecting rod, and a corresponding second solder ribbon clamping assembly is provided with a second connecting slide block, the second connecting slide block penetrating into the second connecting slide hole and being slidable in the second connecting slide hole.

By providing the first connecting slide hole in the end of the first connecting rod and the first connecting slide block on the corresponding first solder ribbon clamping assembly, a movable connection between adjacent first solder ribbon clamping assemblies is achieved, that is, the adjacent first solder ribbon clamping assemblies can be displaced within a certain stroke. Similarly, by providing the second connecting slide hole in the end of the first connecting rod and the second connecting slide block on the corresponding second solder ribbon clamping assembly, a movable connection between adjacent second solder ribbon clamping assemblies is achieved, that is, the adjacent second solder ribbon clamping assemblies can be displaced within a certain stroke.

In some embodiments, the frontmost first solder ribbon clamping assembly is located in front of the frontmost second solder ribbon clamping assembly, and the frontmost first solder ribbon clamping assembly is configured to be liftable in a vertical direction or the frontmost second solder ribbon clamping assembly is located in front of the frontmost first solder ribbon clamping assembly, and the frontmost second solder ribbon clamping assembly is configured to be liftable in the vertical direction.

The frontmost first solder ribbon clamping assembly or the frontmost second solder ribbon clamping assembly is configured to be liftable such that the solder ribbon drawing mechanism can be avoided.

In some embodiments, the first solder ribbon head clamp group of the frontmost first solder ribbon clamping assembly is configured to be liftable in the vertical direction; or the second solder ribbon head clamp group of the frontmost second solder ribbon clamping assembly is configured to be liftable in the vertical direction.

The solder ribbon drawing mechanism can be avoided by configuring the first solder ribbon head clamp group of the frontmost first solder ribbon clamping assembly or the second solder ribbon head clamp group of the frontmost second solder ribbon clamping assembly to be liftable.

BRIEF DESCRIPTION OF THE DRAWINGS

FIGS. 1 to 7 include reference signs as follows.

Figure 1:
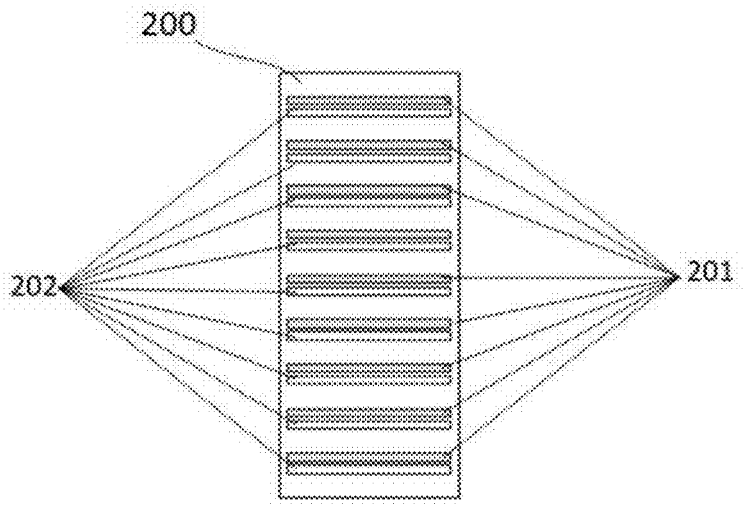
FIG. 1 (Prior Art)
FIG. 1 is a structural diagram of an interdigitated back contact cell.
Figure 2:
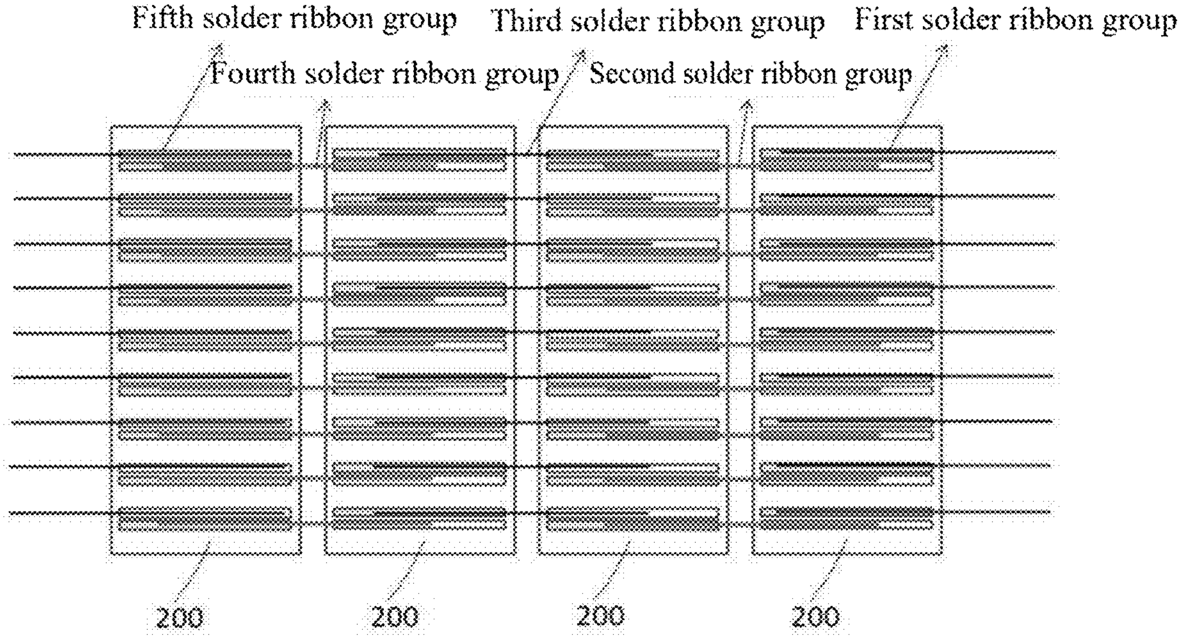
FIG. 2 (Prior Art)
FIG. 2 is a schematic structural diagram of four interdigitated back contact cells after being welded into a string by means of solder ribbon groups.

First solder ribbon clamping assembly 1, second solder ribbon clamping assembly 2, first solder ribbon cutter 3, second solder ribbon cutter 4, misalignment slide rail 5, first solder ribbon group separation slide rail 6, second solder ribbon group separation slide rail 7, connecting rod 8, first solder ribbon head clamp group 11, first solder ribbon tail clamp group 12, first mounting bracket 31, fixed cutter 32, movable cutter 33, movable cutter drive mechanism 34, cutter hook 35;

cell 200, first electrode row 201, and second electrode row 202.

DETAILED DESCRIPTION OF EMBODIMENTS

In order to make the objectives, features and advantages of the present disclosure more clearly understood, the present disclosure will be further described in detail below with reference to the accompanying drawings and specific implementations.

A cell string welding apparatus and a cell string welding method provided by the present disclosure will be introduced respectively by way of example below with reference to two embodiments.

According to a conventional interdigitated back contact cell string welding process, in order to staggered laying of the first solder ribbon groups and the second solder ribbon groups, and a solder ribbon drawing mechanism needs to alternately draw and obtain the first solder ribbon groups and the second solder ribbon groups from a solder ribbon supply station and then lay the first solder ribbon groups and the second solder ribbon groups onto cells in a staggered manner.

The conventional interdigitated back contact cell string welding process has a low solder ribbon processing efficiency, and ultimately affects the production efficiency of a cell string.

In view of this, the present disclosure provides a solder ribbon processing mechanism, which can automatically cut a plurality of solder ribbons in a first horizontal direction drawn out by a solder ribbon drawing mechanism into first solder ribbon groups and second solder ribbon groups, achieve the misaligned processing between the first solder ribbon groups and the second solder ribbon groups, and adjust a distance between the first solder ribbon groups and a distance between the second solder ribbon groups.

In this way, a downstream solder ribbon laying mechanism can lay all of the first solder ribbon groups and the second solder ribbon groups on cells at a time, so that the production efficiency of an IBC cell string is greatly improved.

Figure 3:
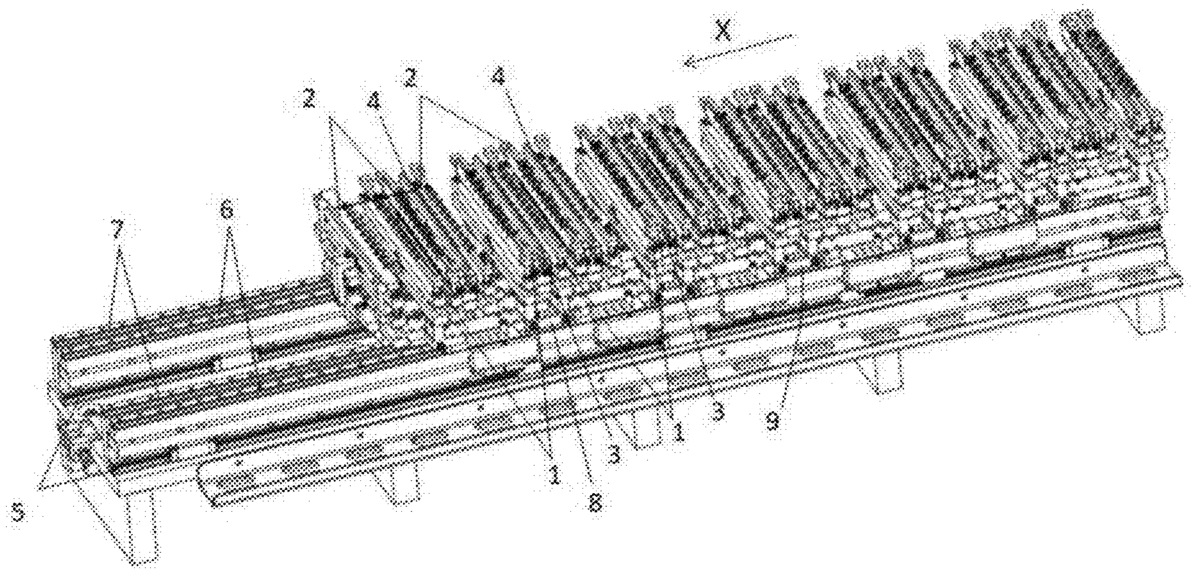
FIG. 3 is a schematic structural diagram of a solder ribbon processing mechanism according to an embodiment of the present disclosure from a perspective.
Figure 4:
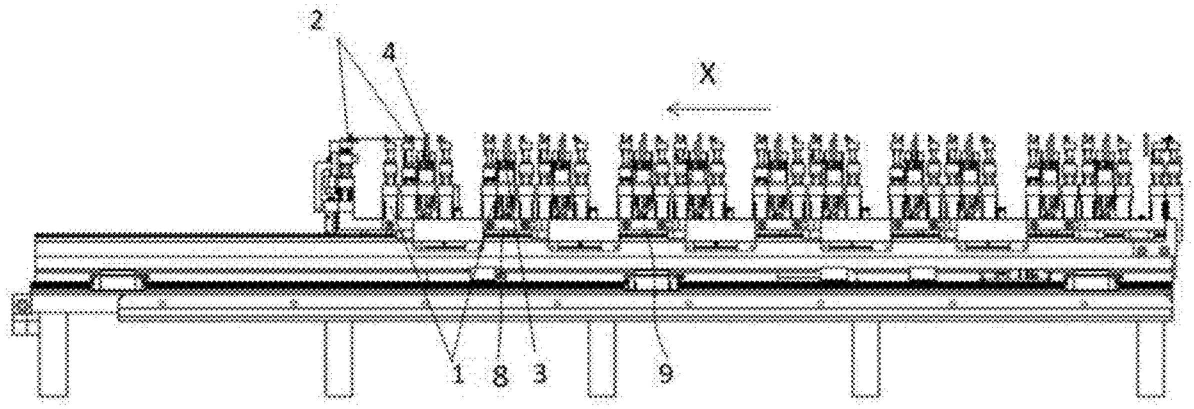
FIG. 4 is a schematic structural diagram of the solder ribbon processing mechanism according to the embodiment of the present disclosure from another perspective.
Figure 5:
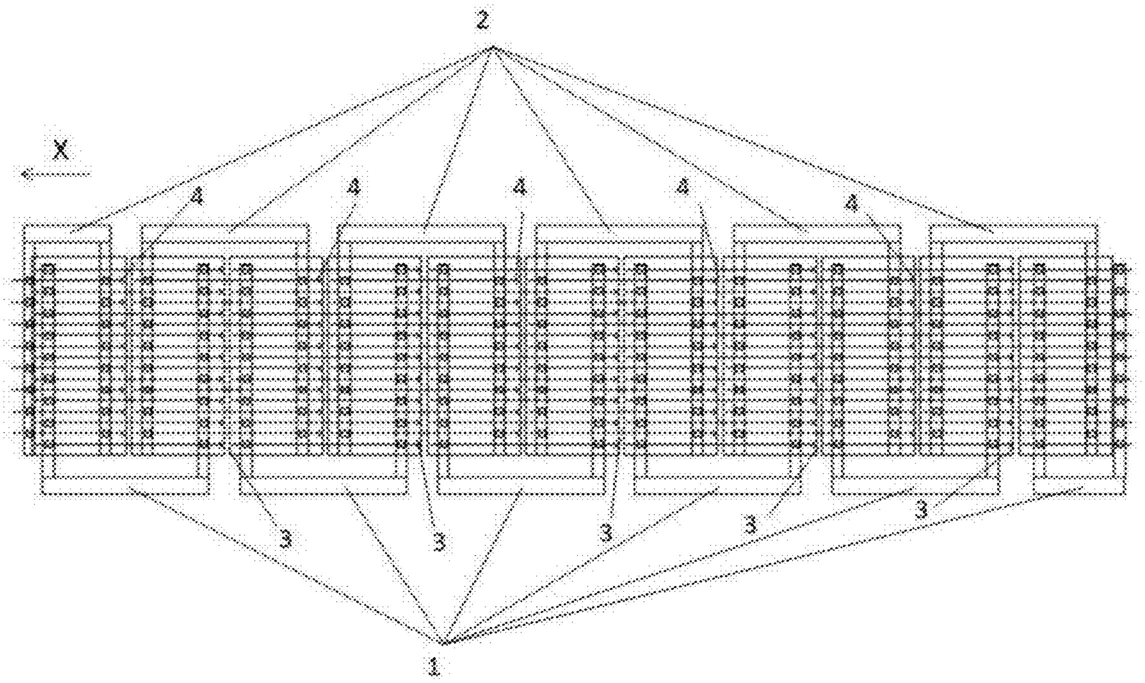
FIG. 5 is a schematic diagram showing that first solder ribbon clamping assemblies and second solder ribbon clamping assembles clamp solder ribbons according to an embodiment of the present disclosure.

As shown in FIGS. 3 to 5, the solder ribbon processing mechanism provided by the present disclosure includes a plurality of first solder ribbon clamping assemblies 1, a plurality of second solder ribbon clamping assemblies 2, a plurality of first solder ribbon cutters 3 and a plurality of second solder ribbon cutters 4 which are arranged in the first horizontal direction (e.g. an X-axis direction in the figures).

The plurality of first solder ribbon clamping assemblies 1 cooperate to clamp all odd numbered solder ribbons of the plurality of solder ribbons, one of the first solder ribbon cutters 3 is arranged between adjacent first solder ribbon clamping assemblies 1, and the first solder ribbon cutters 3 are configured for cutting off all the odd numbered solder ribbons at corresponding positions, so as to obtain a plurality of first solder ribbon groups.

The plurality of second solder ribbon clamping assemblies 2 cooperate to clamp all even numbered solder ribbons of the plurality of solder ribbons, one of the second solder ribbon cutter 4 is arranged between adjacent second solder ribbon clamping assemblies 2, and the second solder ribbon cutters 4 are configured for cutting off all the even numbered solder ribbons at corresponding positions, so as to obtain a plurality of second solder ribbon groups.

Before all the odd numbered solder ribbons are cut off, the plurality of first solder ribbon clamping assemblies 1 and the plurality of second solder ribbon clamping assemblies 2 are relatively translated in the first horizontal direction, such that all the odd numbered solder ribbons are staggered with all the even numbered solder ribbons by a predetermined distance in the first horizontal direction.

After all the odd numbered solder ribbons are cut off, the first solder ribbon clamping assemblies 1 each clamp a corresponding first solder ribbon group, and the first solder ribbon clamping assemblies 1 are further configured to be separated from each other in the first horizontal direction to separate the first solder ribbon groups from each other.

After all the even numbered solder ribbons are cut off, the second solder ribbon clamping assemblies 2 each clamp a corresponding second solder ribbon group, and the individual second solder ribbon clamping assemblies 2 are further configured to be separated from each other in the first horizontal direction to separate the individual second solder ribbon groups from each other.

In order to enable those skilled in the art to more clearly understand the structure and operating principles of the solder ribbon processing mechanism provided by the present disclosure, an operating process of the solder ribbon processing mechanism provided by an embodiment of the present disclosure will be described by way of example below.

As shown in FIG. 5, in an embodiment, the solder ribbon processing mechanism provided by the present disclosure includes six first solder ribbon clamping assemblies 1, six second solder ribbon clamping assemblies 2, five first solder ribbon cutters 3, and five second solder ribbon cutters 4, wherein a first solder ribbon cutter 3 is arranged between any two adjacent first solder ribbon clamping assemblies 1, and a second solder ribbon cutter 4 is arranged between any two adjacent second solder ribbon clamping assemblies 2.

The process of cutting and adjusting the solder ribbons by the solder ribbon processing mechanism in the embodiment of FIG. 5 is as follows.

First, a solder ribbon drawing mechanism is used to draw a plurality of (e.g., 17 in the figure) solder ribbons extending in the first horizontal direction (e.g., the X-axis direction in the figure) onto the solder ribbon processing mechanism.

The first solder ribbon clamping assemblies 1 and the second solder ribbon clamping assemblies 2 are controlled to clamp the solder ribbons, wherein the six first solder ribbon clamping assemblies 1 cooperate to clamp all the odd numbered solder ribbons at different positions, and the six second solder ribbon clamping assemblies 2 cooperate to clamp all the even numbered solder ribbons at different positions.

The six first solder ribbon clamping assemblies 1 are controlled to be translated relative to the six second solder ribbon clamping assemblies 2, such that all the odd numbered solder ribbons are staggered with all the even numbered solder ribbons by a predetermined distance in the first horizontal direction.

Next, the five first solder ribbon cutters 3 and the five second solder ribbon cutters 4 are controlled to simultaneously cut off all the odd numbered solder ribbons and all the even numbered solder ribbons at the corresponding positions. In this way, six first solder ribbon groups and six second solder ribbon groups are obtained. In addition, each first solder ribbon group is clamped by a corresponding first solder ribbon clamping assembly 1, and each second solder ribbon group is clamped by a corresponding second solder ribbon clamping assembly 2.

Finally, the six first solder ribbon clamping assemblies 1 are controlled to be translated for separation from each other, the distance between the six first solder ribbon groups are adjusted to be the predetermined distance. The six second solder ribbon clamping assemblies 2 are controlled to be translated for separation from each other, the distance between the six second solder ribbon groups are adjusted to be the predetermined distance.

With continued reference to FIG. 3, optionally, the solder ribbon processing mechanism in the embodiment of the present disclosure further includes a base, and misalignment slide rails 5, first solder ribbon group separation slide rails 6 and second solder ribbon group separation slide rails 7 which extend in the first horizontal direction.

The misalignment slide rails 5 are arranged on the base, the first solder ribbon group separation slide rails 6 are slidably connected to the misalignment slide rails 5, and the plurality of first solder ribbon clamping assemblies 1 are connected to the first solder ribbon group separation slide rails 6.

The second solder ribbon group separation slide rails 7 are arranged on the base, and the plurality of second solder ribbon clamping assemblies 2 are connected to the second solder ribbon group separation slide rails 7.

Before all the odd numbered solder ribbons are cut off, the first solder ribbon group separation slide rails 6 are controlled to slide along the misalignment slide rails 5, so that all the odd numbered solder ribbons are staggered with all the even numbered solder ribbons by the predetermined distance in the first horizontal direction.

After all the odd numbered solder ribbons are cut off, the plurality of first solder ribbon clamping assemblies 1 are controlled to slide apart along the first solder ribbon group separation slide rails 6, so that the distance between the first solder ribbon groups are adjusted to be the predetermined distance.

After all the even numbered solder ribbons are cut off, the plurality of second solder ribbon clamping assemblies 2 are controlled to slide apart along the second solder ribbon group separation slide rails 7, so that the distance between the second solder ribbon groups are adjusted to be the predetermined distance.

Optionally, the solder ribbon processing mechanism in the embodiment of the present disclosure further includes a misalignment drive assembly, a first separation drive assembly, and a second separation drive assembly which are arranged on the base, wherein the misalignment drive assembly is configured for driving the first solder ribbon group separation slide rails 6 to slide along the misalignment slide rails 5, the first separation drive assembly is configured for driving the plurality of first solder ribbon clamping assemblies 1 to slide apart along the first solder ribbon group separation slide rails 6, and the second separation drive assembly is configured for driving the plurality of second solder ribbon clamping assemblies 2 to slide apart along the second solder ribbon group separation slide rails 7.

It can be seen that automatic misalignment between the first solder ribbon clamping assemblies and the second solder ribbon clamping assemblies can be achieved by providing the misalignment drive assembly. Automatic separation between the first solder ribbon clamping assemblies and between the second solder ribbon clamping assemblies is achieved by providing the first separation drive assembly and the second separation drive assembly.

As shown in FIGS. 3 and 4, optionally, a rearmost first solder ribbon clamping assembly 1 of the plurality of first solder ribbon clamping assemblies 1 is fixed to the first solder ribbon group separation slide rails 6, and the remaining first solder ribbon clamping assemblies 1 are each slidably connected to the first solder ribbon group separation slide rails 6. A driving end of the first separation drive assembly is connected to a frontmost first solder ribbon clamping assembly 1.

Adjacent first solder ribbon clamping assemblies 1 are connected by means of a first connecting rod 8, wherein the first connecting rod 8 is movably connected to a corresponding first solder ribbon clamping assembly 1 at at least one end and is slidable relative to the first solder ribbon clamping assembly 1 in the first horizontal direction. In this way, a relative displacement is achieved between the adjacent first solder ribbon clamping assemblies 1.

In an initial state, the first solder ribbon clamping assemblies 1 are in proximity to each other. Upon that the first cutters 3 have cut off all the odd numbered solder ribbons to obtain a plurality of first solder ribbon groups, the first separation drive assembly drives the frontmost first solder ribbon clamping assembly 1 to slide away from the rearmost first solder ribbon clamping assembly 1 and thus drives the plurality of first solder ribbon clamping assemblies 1 to slide apart until the distance between the first solder ribbon groups is adjusted to be the predetermined distance.

With the above configuration of the mounting of the first solder ribbon clamping assemblies 1, the first solder ribbon clamping assemblies can be driven to slide apart only by controlling the first separation drive assembly to drive the frontmost first solder ribbon clamping assembly to slide. A conventional linear drive device such as an air cylinder and a lead-screw motor can be used as the first separation drive assembly.

Similarly, the rearmost second solder ribbon clamping assembly 2 of the plurality of second solder ribbon clamping assemblies 2 is fixed to the second solder ribbon group separation slide rails 7, and the remaining second solder ribbon clamping assemblies 2 are slidably connected to the second solder ribbon group separation slide rails 7. A driving end of the second separation drive assembly is connected to the frontmost second solder ribbon clamping assembly 2.

Adjacent second solder ribbon clamping assemblies 2 are connected by means of a second connecting rod 9, wherein the second connecting rod 9 is movably connected to a corresponding second solder ribbon clamping assembly 2 at least one end and is slidable relative to the first solder ribbon clamping assembly 2 in the first horizontal direction. In this way, a relative displacement is achieved between the adjacent second solder ribbon clamping assemblies 2.

In the initial state, the second solder ribbon clamping assemblies 2 are in proximity to each other. Upon that the second cutters 4 have cut off all the even numbered solder ribbons to obtain a plurality of second solder ribbon groups, the second separation drive assembly drives the frontmost second solder ribbon clamping assembly 2 to slide away from the rearmost second solder ribbon clamping assembly 2 and thus drives the plurality of second solder ribbon clamping assemblies to slide apart until the distance between the second solder ribbon groups is adjusted to be the predetermined distance.

With the above configuration of the mounting of the second solder ribbon clamping assemblies 2, the second solder ribbon clamping assemblies can be driven to slide apart only by controlling the second separation drive assembly to drive the frontmost second solder ribbon clamping assembly to slide. A conventional linear drive device such as an air cylinder and a lead-screw motor can be used as the second separation drive assembly.

In order to achieve the movable connection between an end of the first connecting rod 8 and the first solder ribbon clamping assembly 1, it is ensured that the first connecting rod 8 can slide upwards relative to the first solder ribbon clamping assembly 1 in the first horizontal direction. Optionally, a first connecting slide hole (e.g. a waist-shaped hole) extending in the first horizontal direction is provided in at least one end of the first connecting rod 8, and a corresponding first solder ribbon clamping assembly 1 is provided with a first connecting slide block which penetrates into the first connecting slide hole and which is slidable in the first connecting slide hole.

Similarly, a second connecting slide hole (e.g. a waist-shaped hole) extending in the first horizontal direction is provided in at least one end of the second connecting rod 9, and a corresponding second solder ribbon clamping assembly 2 is provided with a second connecting slide block which penetrates into the second connecting slide hole and which is slidable in the second connecting slide hole.

Figure 6:
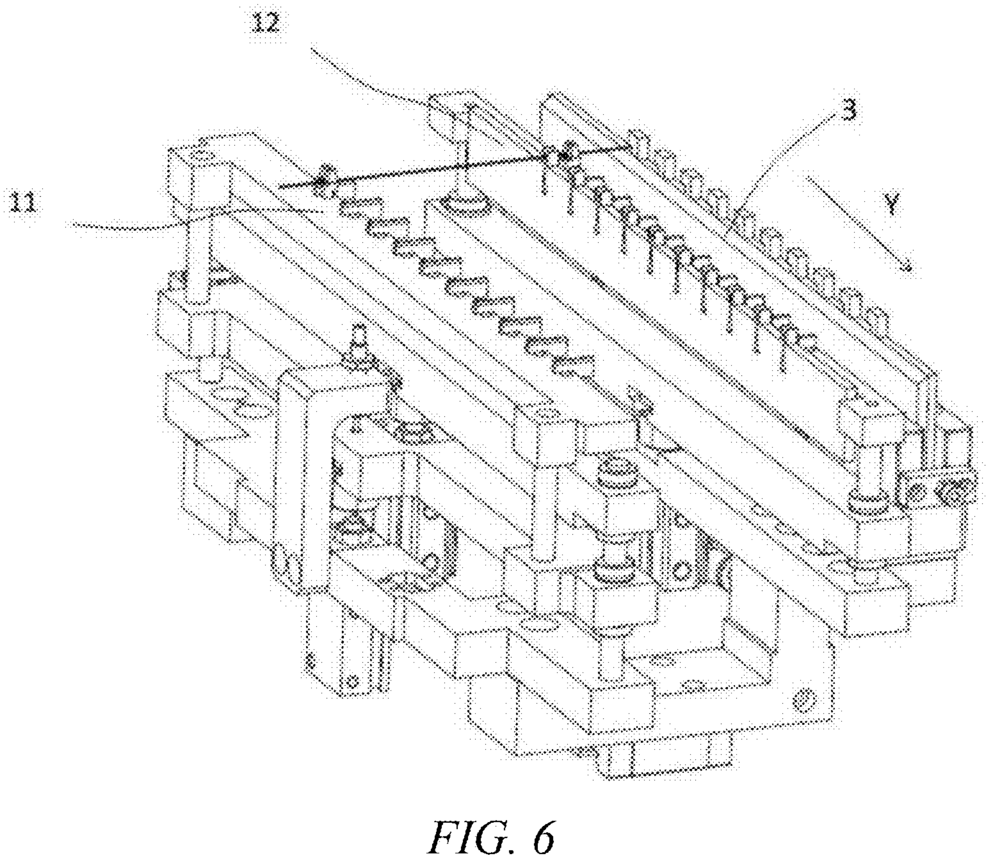
FIG. 6 is a schematic assembly diagram of a first solder ribbon clamping assembly and a corresponding first solder ribbon cutter according to an embodiment of the present disclosure.

As shown in FIG. 6, optionally, the first solder ribbon clamping assembly 1 includes a first solder ribbon head clamp group 11 and a first solder ribbon tail clamp group 12. After the solder ribbons are drawn onto the solder ribbon processing mechanism, the first solder ribbon head clamp group 11 and the first solder ribbon tail clamp group 12 cooperate to clamp all the odd numbered solder ribbons at corresponding positions. After all the odd numbered solder ribbons are cut off, the first solder ribbon head clamp group 11 clamps the heads of corresponding first solder ribbon groups, and the first solder ribbon tail clamp group 12 clamps the tails of the corresponding first solder ribbon groups.

Optionally, the first solder ribbon head clamp group 11 and the first solder ribbon tail clamp group 12 each include a plurality of first clamps arranged in a second horizontal direction (e.g., a Y-axis direction in FIG. 6) perpendicular to the first horizontal direction. After all the odd numbered solder ribbons are cut off, the first clamps of the first solder ribbon head clamp group 11 each clamp the head of a corresponding first solder ribbon, and the first clamps of the first solder ribbon tail clamp group 12 each clamp the tail of the corresponding first solder ribbon.

The second solder ribbon clamping assembly 2 is identical to the first solder ribbon clamping assembly 1 in terms of structure, and includes a second solder ribbon head clamp group and a second solder ribbon tail clamp group. After the solder ribbons are drawn onto the solder ribbon processing mechanism, the second solder ribbon head clamp group and the second solder ribbon tail clamp group cooperate to clamp all the even numbered solder ribbons at corresponding positions. After all the even numbered solder ribbons are cut off, the second solder ribbon head clamp group clamps the heads of corresponding first solder ribbon groups, and the second solder ribbon tail clamp group clamps the tails of the corresponding first solder ribbon groups.

Optionally, the second solder ribbon head clamp group and the second solder ribbon tail clamp group each include a plurality of second clamps arranged in the second horizontal direction. After all the even numbered solder ribbons are cut off, the second clamps of the second solder ribbon tail clamp group each clamp the head of a corresponding second solder ribbon, and the second clamps of the second solder ribbon tail clamp group each second the tail of the corresponding second solder ribbon.

Optionally, in order to avoid the solder ribbon drawing mechanism and to prevent the solder ribbon drawing mechanism from bumping against the first solder ribbon clamping assembly 1 or the frontmost second solder ribbon clamping assembly 2 when drawing the solder ribbons onto the solder ribbon processing mechanism, the first solder ribbon clamping assembly 1 or the frontmost second solder ribbon clamping assembly 2 is configured to be liftable.

When it is required to draw the solder ribbons onto the solder ribbon processing mechanism, the frontmost first solder ribbon clamping assembly or the frontmost second solder ribbon clamping assembly is first controlled to descend to a low position, so as to avoid the solder ribbon drawing mechanism. After the solder ribbons are drawn, the frontmost first solder ribbon clamping assembly or the frontmost second solder ribbon clamping assembly is then controlled to ascend to its original position.

Further, it is possible to configure only the first solder ribbon head clamp group 11 of the frontmost first solder ribbon clamping assembly 1 for clamping the heads of the solder ribbons to be liftable, or configure only the second solder ribbon head clamp group of the frontmost second solder ribbon clamping assembly 2 for clamping the heads of the solder ribbons to be liftable.

When it is required to draw the solder ribbons onto the solder ribbon processing mechanism, either the first solder ribbon head clamp group 11 of the frontmost first solder ribbon clamping assembly 1 or the second solder ribbon head clamp group of the frontmost second solder ribbon clamping assembly is first controlled to descend to the low position, so as to avoid the solder ribbon drawing mechanism. After the solder ribbons are drawn, the first solder ribbon head clamp group 11 of the frontmost first solder ribbon clamping assembly or the second solder ribbon head clamp group 2 of the frontmost second solder ribbon clamping assembly is then controlled to ascend to its original position.

Figure 7:
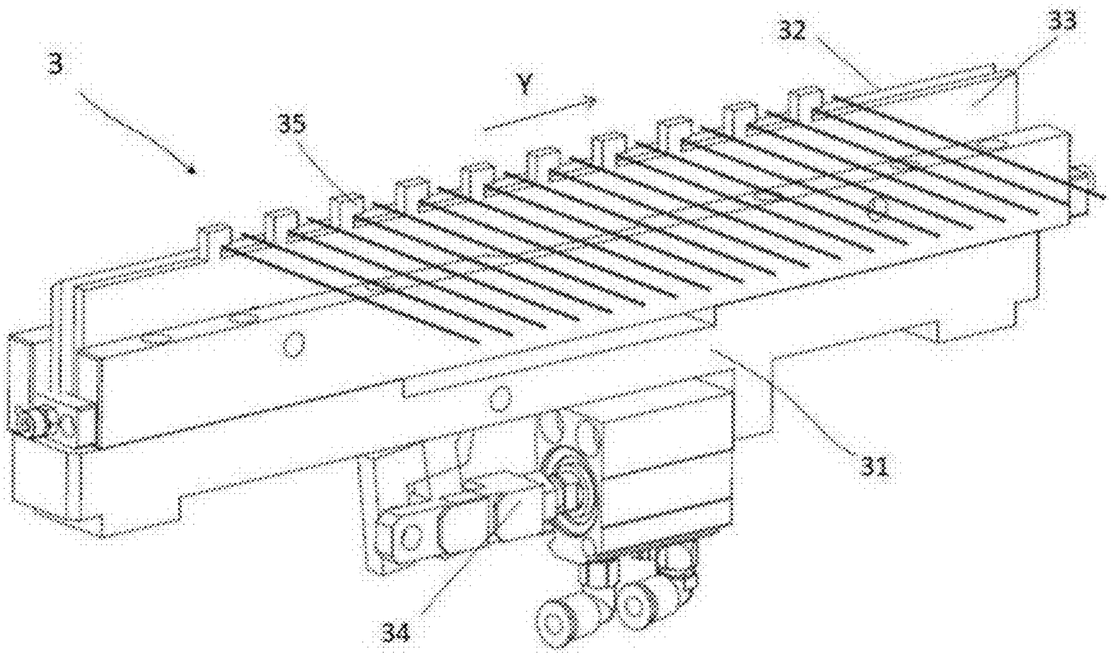
FIG. 7 is a schematic structural diagram of a first solder ribbon cutter according to an embodiment of the present disclosure.

Optionally, the first solder ribbon cutter 3 is identical to the second solder ribbon cutter 4 in terms of structure. Taking the first solder ribbon cutter 3 as an example, as shown in FIG. 7, the cutter includes a first mounting bracket 31, a fixed cutter 32, a movable cutter 33, and a movable cutter drive mechanism 34.

The fixed cutter 32 is fixedly arranged on the first mounting bracket 31 and extends in the second horizontal direction, and a fixed cutting blade is formed at an upper side rim of the fixed cutter 32.

The movable cutter 33 is slidably arranged on the first mounting bracket 31 and fits with the fixed cutter 32, the movable cutter 33 is provided with a plurality of cutter hooks 35 arranged side by side in the second horizontal direction, the cutter hooks 35 protrude upwardly from the upper side rim of the movable cutter 33, and a movable cutting blade is formed at a lower side rim of each of the cutter hooks 35.

The movable cutter drive mechanism 34 is configured for driving the movable cutter 33 to slide relative to the fixed cutter 32, so as to enable the movable cutter 33 to switch between a higher position and a lower position. When the movable cutter 33 slides to the higher position, a gap is formed between the movable cutting blade of each of the cutter hooks 35 and the fixed cutting blade of the fixed cutter 32 for a solder ribbon to pass through. When the movable cutter 33 slides to the lower position, the movable cutting blades of the cutter hooks 35 and the fixed cutting blade of the fixed cutter 32 cooperate to cut off the odd numbered solder ribbons passing therebetween.

Since an avoidance space is formed between adjacent cutter hooks 35, when cutting off all the odd numbered solder ribbons, the first solder ribbon cutters 3 can avoid all the even numbered solder ribbons which do not need to be cut.

Similarly, when cutting off all the even numbered solder ribbons, the second solder ribbon cutters 4 can avoid all the odd numbered solder ribbons which do not need to be cut.

Optionally, the first solder ribbon cutters 3 are connected to the former one of two adjacent first solder ribbon clamping assemblies 1, such as the first solder ribbon tail clamp group 12 of the first solder ribbon clamping assembly 1 on the front side as shown in FIG. 6. In this way, the first solder ribbon cutters 3 can slide synchronously with corresponding first solder ribbon clamping assemblies 1 during the misalignment of the solder ribbons, and upon that the solder ribbons are misaligned, the first solder ribbon cutters 3 can cut off all the odd numbered solder ribbons at corresponding positions, so as to obtain the first solder ribbon groups.

Similarly, the second solder ribbon cutters 4 are connected to the former one of two adjacent second solder ribbon clamping assemblies 2, such as the second solder ribbon tail clamp group of the former second solder ribbon clamping assembly 2. In this way, the second solder ribbon cutters 4 can slide synchronously with corresponding second solder ribbon clamping assemblies 2 during the misalignment of the solder ribbons, and upon that the solder ribbons are misaligned, the second solder ribbon cutters 4 can cut off all the even numbered solder ribbons at corresponding positions, so as to obtain the second solder ribbon groups.

It should be noted that various optional implementations of the first embodiment described above are also applicable to this embodiment, which will not be described here again.

The forgoing gives a certain specific description of the present disclosure in sufficient detail. Those skilled in the art should understand that the description of the embodiments is only exemplary, and all changes made without departing from the true spirit and scope of the present disclosure should fall within the scope of protection of the present disclosure. The scope of protection claimed by the present disclosure is defined by the claims, rather than by the above description of the embodiments.

The invention claimed is:

1. A solder ribbon processing mechanism for processing a plurality of solder ribbons extending in a first horizontal direction to obtain a plurality of first solder ribbon groups and a plurality of second solder ribbon groups, wherein the solder ribbon processing mechanism comprising a plurality of first solder ribbon clamping assemblies, a plurality of second solder ribbon clamping assemblies, a plurality of first solder ribbon cutters and a plurality of second solder ribbon cutters which are arranged in the first horizontal direction, wherein the plurality of first solder ribbon clamping assemblies cooperate to clamp all odd numbered solder ribbons of the plurality of solder ribbons, one of the first solder ribbon cutters is arranged between adjacent first solder ribbon clamping assemblies, and the first solder ribbon cutters are configured for cutting off all the odd numbered solder ribbons at corresponding positions, so as to obtain the plurality of first solder ribbon groups;

the plurality of second solder ribbon clamping assemblies cooperate to clamp all even numbered solder ribbons of the plurality of solder ribbons, one of the second solder ribbon cutters is arranged between adjacent second solder ribbon clamping assemblies, and the second solder ribbon cutters are configured for cutting off all the even numbered solder ribbons at corresponding positions, so as to obtain the plurality of second solder ribbon groups;

before all the odd numbered solder ribbons are cut off, the plurality of first solder ribbon clamping assemblies and the plurality of second solder ribbon clamping assemblies are relatively translated in the first horizontal direction, such that all the odd numbered solder ribbons are staggered with all the even numbered solder ribbons by a predetermined distance in the first horizontal direction;

after all the odd numbered solder ribbons are cut off, the first solder ribbon clamping assemblies each clamp a corresponding first solder ribbon group, and the first solder ribbon clamping assemblies are further configured to be separated from each other in the first horizontal direction to separate the first solder ribbon groups from each other; and after all the even numbered solder ribbons are cut off, the second solder ribbon clamping assemblies each clamp a corresponding second solder ribbon group, and the second solder ribbon clamping assemblies are further configured to be separated from each other in the first horizontal direction to separate the second solder ribbon groups from each other.

2. The solder ribbon processing mechanism of claim 1, wherein each of the first solder ribbon clamping assemblies comprises a first solder ribbon head clamp group and a first solder ribbon tail clamp group, the first solder ribbon head clamp group and the first solder ribbon tail clamp group cooperate to clamp all the odd numbered solder ribbons at corresponding positions, and after all the odd numbered solder ribbons are cut off, the first solder ribbon head clamp group clamp the heads of corresponding first solder ribbon groups, and the first solder ribbon tail clamp group clamp the tails of the corresponding first solder ribbon groups; and each of the second solder ribbon clamping assemblies comprises a second solder ribbon head clamp group and a second solder ribbon tail clamp group, the second solder ribbon head clamp group and the second solder ribbon tail clamp group cooperate to clamp all the even numbered solder ribbons at corresponding positions, and after all the even numbered solder ribbons are cut off, the second solder ribbon head clamp group clamps the heads of corresponding second solder ribbon groups, and the second solder ribbon tail clamp group clamps the tails of the corresponding second solder ribbon groups.

3. The solder ribbon processing mechanism of claim 2, wherein the first solder ribbon head clamp group and the first solder ribbon tail clamp group each comprise a plurality of first clamps arranged in a second horizontal direction perpendicular to the first horizontal direction, and after all the odd numbered solder ribbons are cut off, the first clamps each clamp the head or the tail of a corresponding first solder ribbon; and the second solder ribbon head clamp group and the second solder ribbon tail clamp group each comprise a plurality of second clamps arranged in the second horizontal direction, and after all the even numbered solder ribbons are cut off, the second clamps each clamp the head or the tail of a corresponding second solder ribbon.

4. The solder ribbon processing mechanism of claim 2, wherein a frontmost first solder ribbon clamping assembly of the first solder ribbon clamping assemblies is located in front of a frontmost second solder ribbon clamping assembly of the second solder ribbon clamping assemblies, and the frontmost first solder ribbon clamping assembly is configured to be liftable in a vertical direction.

5. The solder ribbon processing mechanism of claim 4, wherein the first solder ribbon head clamp group of the frontmost first solder ribbon clamping assembly is configured to be liftable in the vertical direction.

6. The solder ribbon processing mechanism of claim 4, wherein the second solder ribbon head clamp group of the frontmost second solder ribbon clamping assembly is configured to be liftable in the vertical direction.

7. The solder ribbon processing mechanism of claim 2, wherein a frontmost second solder ribbon clamping assembly of the second solder ribbon clamping assemblies is located in front of a frontmost first solder ribbon clamping assembly of the first solder ribbon clamping assemblies, and the frontmost second solder ribbon clamping assembly is configured to be liftable in the vertical direction.

8. The solder ribbon processing mechanism of claim 7, wherein the first solder ribbon head clamp group of the frontmost first solder ribbon clamping assembly is configured to be liftable in the vertical direction.

9. The solder ribbon processing mechanism of claim 7, wherein the second solder ribbon head clamp group of the frontmost second solder ribbon clamping assembly is configured to be liftable in the vertical direction.

10. The solder ribbon processing mechanism of claim 1, wherein the first solder ribbon cutter and the second solder ribbon cutter each comprise a mounting bracket, a fixed cutter, a movable cutter, and a movable cutter drive mechanism, wherein the fixed cutter is fixedly arranged on the mounting bracket and extends in the second horizontal direction, and a fixed cutting blade is formed at an upper side rim of the fixed cutter;

the movable cutter is slidably arranged on the mounting bracket and fits with the fixed cutter, the movable cutter is provided with a plurality of cutter hooks arranged side by side in the second horizontal direction, the cutter hooks protrude upwardly from the upper side rim of the movable cutter, and a movable cutting blade is formed at a lower side rim of each of the cutter hooks;

the movable cutter drive mechanism is configured for driving the movable cutter to slide relative to the fixed cutter, so as to enable the movable cutter to switch between a higher position and a lower position; and when the movable cutter slides to the higher position, a gap is formed between the movable cutting blade of each of the cutter hooks and the fixed cutting blade of the fixed cutter for a solder ribbon to pass through; and when the movable cutter slides to the lower position, the movable cutting blades of the cutter hooks and the fixed cutting blade of the fixed cutter cooperate to cut off the solder ribbons passing therebetween.

11. The solder ribbon processing mechanism of claim 1, wherein the first solder ribbon cutters are connected to the former one of adjacent first solder ribbon clamping assemblies; and the second solder ribbon cutters are connected to the former one of adjacent second solder ribbon clamping assemblies.

12. The solder ribbon processing mechanism of claim 1, wherein the solder ribbon processing mechanism further comprises a base, and misalignment slide rails, first solder ribbon group separation slide rails and second solder ribbon group separation slide rails which extend in the first horizontal direction, wherein the misalignment slide rails are arranged on the base, the first solder ribbon group separation slide rails are slidably connected to the misalignment slide rails, and the plurality of first solder ribbon clamping assemblies are connected to the first solder ribbon group separation slide rails;

the second solder ribbon group separation slide rails are arranged on the base, and the plurality of second solder ribbon clamping assemblies are connected to the second solder ribbon group separation slide rails;

before all the odd numbered solder ribbons are cut off, the first solder ribbon group separation slide rails slide along the misalignment slide rails, such that all the odd numbered solder ribbons are staggered with all the even numbered solder ribbons by the predetermined distance in the first horizontal direction;

after all the odd numbered solder ribbons are cut off, the plurality of first solder ribbon clamping assemblies slide apart along the first solder ribbon group separation slide rails to separate the first solder ribbon groups from each other; and after all the even numbered solder ribbons are cut off, the plurality of second solder ribbon clamping assemblies slide apart along the second solder ribbon group separation slide rails to separate the second solder ribbon groups from each other.

13. The solder ribbon processing mechanism of claim 12, wherein the solder ribbon processing mechanism further comprises a misalignment drive assembly, a first separation drive assembly, and a second separation drive assembly which are arranged on the base, wherein the misalignment drive assembly is configured for driving the first solder ribbon group separation slide rails to slide along the misalignment slide rails; the first separation drive assembly is configured for driving the plurality of first solder ribbon clamping assemblies to slide apart along the first solder ribbon group separation slide rails; and the second separation drive assembly is configured for driving the plurality of second solder ribbon clamping assemblies to slide apart along the second solder ribbon group separation slide rails.

14. The solder ribbon processing mechanism of claim 13, wherein a rearmost first solder ribbon clamping assembly of the plurality of first solder ribbon clamping assemblies is fixed to the first solder ribbon group separation slide rails, and the remaining first solder ribbon clamping assemblies are slidably connected to the first solder ribbon group separation slide rails; adjacent first solder ribbon clamping assemblies are connected by means of a first connecting rod, wherein the first connecting rod is movably connected to a corresponding first solder ribbon clamping assembly at at least one end and is slidable relative to the first solder ribbon clamping assembly in the first horizontal direction;

a driving end of the first separation drive assembly is connected to a frontmost first solder ribbon clamping assembly, and the first separation drive assembly drives the frontmost first solder ribbon clamping assembly to slide, so as to drive the plurality of first solder ribbon clamping assemblies to slide apart;

a rearmost second solder ribbon clamping assembly of the plurality of second solder ribbon clamping assemblies is fixed to the second solder ribbon group separation slide rails, and the remaining second solder ribbon clamping assemblies are slidably connected to the second solder ribbon group separation slide rails; adjacent second solder ribbon clamping assemblies are connected by means of a second connecting rod, wherein the second connecting rod is movably connected to a corresponding second solder ribbon clamping assembly at at least one end and is slidable relative to the second solder ribbon clamping assembly in the first horizontal direction; and a driving end of the second separation drive assembly is connected to a frontmost second solder ribbon clamping assembly, and the second separation drive assembly drives the frontmost second solder ribbon clamping assembly to slide, so as to drive the plurality of second solder ribbon clamping assemblies to slide apart.

15. The solder ribbon processing mechanism of claim 14, wherein a first connecting slide hole extending in the first horizontal direction is provided in at least one end of the first connecting rod, and a corresponding first solder ribbon clamping assembly is provided with a first connecting slide block, the first connecting slide block penetrating into the first connecting slide hole and being slidable in the first connecting slide hole; and a second connecting slide hole extending in the first horizontal direction is provided in at least one end of the second connecting rod, and a corresponding second solder ribbon clamping assembly is provided with a second connecting slide block, the second connecting slide block penetrating into the second connecting slide hole and being slidable in the second connecting slide hole.

* * * * *